US009628719B2

(12) United States Patent
Kim

(10) Patent No.: US 9,628,719 B2
(45) Date of Patent: Apr. 18, 2017

(54) READ-OUT MODE CHANGEABLE DIGITAL PHOTOGRAPHING APPARATUS AND METHOD OF CONTROLLING THE SAME

(71) Applicant: Samsung Electronics Co., Ltd, Suwon-si, Gyeonggi-do (KR)

(72) Inventor: Seong-hyun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 269 days.

(21) Appl. No.: 14/265,807

(22) Filed: Apr. 30, 2014

(65) Prior Publication Data
US 2015/0085077 A1 Mar. 26, 2015

(30) Foreign Application Priority Data

Sep. 23, 2013 (KR) ........................ 10-2013-0112859

(51) Int. Cl.
H04N 5/235 (2006.01)
H04N 5/232 (2006.01)
H04N 5/345 (2011.01)
H04N 5/353 (2011.01)
H04N 13/02 (2006.01)

(52) U.S. Cl.
CPC ......... H04N 5/2353 (2013.01); H04N 5/2351 (2013.01); H04N 5/23245 (2013.01); H04N 5/3452 (2013.01); H04N 5/353 (2013.01); H04N 13/021 (2013.01); H04N 13/0296 (2013.01); H04N 13/0285 (2013.01)

(58) Field of Classification Search
CPC .. H04N 5/2353; H04N 5/23245; H04N 5/353; H04N 13/021; H04N 13/0296; H04N 5/3452; H04N 5/2351; H04N 13/0285; H04N 13/02; H04N 5/232
USPC .......................................................... 348/46
See application file for complete search history.

(56) References Cited

U.S. PATENT DOCUMENTS

2002/0085112 A1* 7/2002 Hiramatsu ........... H04N 5/2353 348/362
2008/0002038 A1* 1/2008 Suwa ................. H04N 5/23245 348/229.1
2012/0212663 A1* 8/2012 Takita .................. H04N 5/2353 348/364
2012/0268570 A1* 10/2012 Trumbull ........... H04N 13/0296 348/47
2013/0009916 A1 1/2013 Tseng

* cited by examiner

Primary Examiner — Thai Tran
Assistant Examiner — Nien-Ru Yang
(74) Attorney, Agent, or Firm — Staas & Halsey LLP

(57) ABSTRACT

Provided are a digital photographing apparatus in which a read-out mode may be changed when capturing a moving image, and a method of controlling the digital photographing apparatus. The method includes capturing a moving image having a predetermined frame rate in a first read-out mode, estimating a brightness of surroundings and then determining a shutter speed of a frame to be currently captured based on the estimated brightness of the surroundings, determining whether or not an exposure time that is dependent on the shutter speed is longer than a predetermined time period, and changing the first read-out mode to a second read-out mode that has a shorter read-out time than the first read-out mode when the exposure time is longer than the predetermined time period.

21 Claims, 13 Drawing Sheets

READ-OUT MODE CHANGEABLE DIGITAL PHOTOGRAPHING APPARATUS AND METHOD OF CONTROLLING THE SAME

CROSS-REFERENCE TO RELATED APPLICATIONS

This application claims the benefit of priority under 35 U.S.C. §119 from Korean Patent Application No. 10-2013-0112859, filed on Sep. 23, 2013, in the Korean Intellectual Property Office, the disclosure of which is incorporated herein in its entirety by reference.

BACKGROUND OF THE INVENTION

1. Field of the Invention

One or more embodiments of the present general inventive concept relate to a digital photographing apparatus having a changeable read out mode and a method of controlling the same, and more particularly, to a digital photographing apparatus in which a read-out mode may be changed according to the brightness of surroundings during capturing of a moving image, and a method of controlling the digital photographing apparatus.

2. Description of the Related Art

Digital photographing apparatuses are being improved so as to support a mode to capture a moving image having a high frame rate so that a user may capture a smooth moving image at a satisfactory level.

When a shutter speed slows down due to dark surroundings, it is difficult to maintain the high frame rate. For example, when the surroundings turn dark, an image sensor receives less light. Therefore, the digital photographing apparatuses require a longer exposure time, that is, the shutter speed needs to slow down, so that brightness of an image being captured is maintained. However, when capturing a moving image, it is generally required to capture images at a high speed of 30 frames or more per second. Thus, when the shutter speed is slower than a predetermined speed, it is difficult to maintain the high frame rate.

In order to solve the problem described above, the frame rate is temporarily reduced to obtain an exposure time according to the brightness of surroundings.

However, when the frame rate is reduced to obtain the exposure time, the user may experience visual inconveniences, such as time lag.

Similarly, when the frame rate is reduced in 3-dimensional (3D) photography due to dark surroundings, the desired shutter speed may be obtained, but the user may experience visual inconveniences, such as dizziness, due to large differences between left and right images. Furthermore, in order to capture a 3D moving image, left and right liquid crystal shutters need to be turned on or off for each frame. Thus, the shutter speed needs to be faster.

SUMMARY OF THE INVENTION

One or more embodiments of the present general inventive concept include a digital photographing apparatus that may obtain an exposure time (i.e., shutter speed) by changing a read-out mode according to the brightness of surroundings when capturing a moving image, and a method of controlling the digital photographing apparatus.

Additional features and utilities of the present general inventive concept will be set forth in part in the description which follows and, in part, will be apparent from the description, or may be learned by practice of the general inventive concept.

The foregoing and/or other features and utilities of the present general inventive concept may be achieved by providing a method of controlling a digital photographing apparatus in which a read-out mode may be changed when capturing a moving image, the method including capturing a moving image having a predetermined frame rate in a first read-out mode, estimating a brightness of surroundings, and then determining a shutter speed of a frame to be currently captured, based on the estimated brightness of the surroundings, determining whether or not an exposure time that is dependent on the shutter speed is longer than a predetermined time period, and changing the first read-out mode to a second read-out mode that has a shorter read-out time than the first read-out mode when the exposure time is longer than the predetermined time period.

A size of a read-out image of the second read-out mode may be upscaled so that the size of the read-out image of the second read-out mode equals a size of a read-out image of the first read-out mode.

The predetermined time period may be a maximum possible exposure time to capture the moving image without changing the predetermined frame rate.

The determining of whether or not the exposure time that is dependent on the shutter speed is longer than the predetermined time period may include estimating a time allocated to each frame when capturing the moving image having the predetermined frame rate, and determining that the exposure time is longer than the predetermined time period when a total sum of the exposure time and a read-out time of the first read-out mode is longer than the time allocated to each frame.

When reading-out image sensors in the second read-out mode, a horizontally skipped line rate of the second read-out mode may be higher than a horizontally skipped line rate of the first read-out mode.

When reading-out the image sensors in the second read-out mode, a vertically skipped line rate of the second read-out mode may be higher than a vertically skipped line rate of the first read-out mode.

The changing of the first read-out mode may include counting a number of frames in which the exposure time is longer than the predetermined time period; and changing the first read-out mode to the second read-out mode when the counted number of the frames is greater than a predetermined number.

The capturing of the moving image may include capturing a 3-dimensional (3D) moving image having a predetermined frame rate in the first read-out mode.

The determining of whether or not the exposure time that is dependent on the shutter speed is longer than the predetermined time period may include estimating a time allocated to each frame when capturing the 3D moving image having the predetermined frame rate, and determining that the exposure time is longer than the predetermined time period when a total sum of the exposure time, a left and right liquid crystal shutters change timing, and a read-out time of the first read-out mode is longer than the time allocated to each frame.

The present general inventive concept may also provide a digital photographing apparatus in which a read-out mode may be changed when capturing a moving image, the digital photographing apparatus including a shutter speed determination unit to estimate a brightness of surroundings and to determine a shutter speed of a frame to be currently captured based on the estimated brightness of the surroundings, a mode change unit to determine whether or not an exposure time that is dependent on the shutter speed is longer than a predetermined time period, and to change the first read-out mode to a second read-out mode that has a shorter read-out time than the first read-out mode when the exposure time is longer than the predetermined time period.

An image scaling unit to upscale a size of a read-out image of the second read-out mode so that the size of the read-out image of the second read-out mode equals a size of a read-out image of the first read-out mode may be further included.

The predetermined time period may be a maximum possible exposure time to capture the moving image without changing the predetermined frame rate.

The mode change unit may estimate a time allocated to each frame when capturing the moving image having the predetermined frame rate, and may determine that the exposure time is longer than the predetermined time period when a total sum of the exposure time and a read-out time of the first read-out mode is longer than the time allocated to each frame.

The apparatus may further include image sensors to convert optical signals into electrical signals, and a digital signal processor to read-out images from the image sensors. When reading-out the image sensors in the second read-out mode, a horizontally skipped line rate of the second read-out mode may be higher than a horizontally skipped line rate of the first read-out mode.

When reading-out the image sensors in the second read-out mode, a vertically skipped line rate of the second read-out mode may be higher than a vertically skipped line rate of the first read-out mode.

The mode change unit may count a number of frames in which the exposure time is longer than the predetermined time period and change the first read-out mode to the second read-out mode when the counted number of the frames is greater than a predetermined number.

The digital photographing apparatus may capture a 3-dimensional (3D) moving image having a predetermined frame rate in the first read-out mode.

The mode change unit may estimate a time allocated to each frame when capturing the 3D moving image having the predetermined frame rate and determine that the exposure time is longer than the predetermined time period when a total sum of the exposure time, a left and right liquid shutter change timing, and a read-out time of the first read-out mode is longer than the time allocated to each frame.

The present general inventive concept may also provide a non-transitory computer-readable recording medium having recorded thereon a program, which, when executed by a computer, performs the method above.

The present general inventive concept may also provide a method of controlling a digital photographing apparatus using a plurality of image sensor read-out modes to capture frames of a moving image, including determining a shutter speed and corresponding exposure time for capturing a frame, determining a sum total of the exposure time and a read-out time of a current read-out mode, changing the read-out mode when the sum total is determined to exceed a frame time of a predetermined frame rate such that the frame may be captured within the frame time of the predetermined frame rate using the determined shutter speed, and capturing the frame.

A resolution of the captured frame may be upscaled when the resolution of the captured frame is lower than a resolution of a prior captured frame due to the change in read-out modes.

Determining the sum total may further include including a left and right liquid crystal shutters change timing for capturing a 3-dimensional moving image within the sum total.

Changing the read-out mode may include counting a number of frames in which the sum total exceeds the frame time of the predetermined frame rate and changing the read-out mode once the number of counted frames exceeds a predetermined number.

BRIEF DESCRIPTION OF THE DRAWINGS

These and/or other features and utilities of the present general inventive concept will become apparent and more readily appreciated from the following description of the embodiments, taken in conjunction with the accompanying drawings in which.

DETAILED DESCRIPTION OF THE PREFERRED EMBODIMENTS

Figure 1:
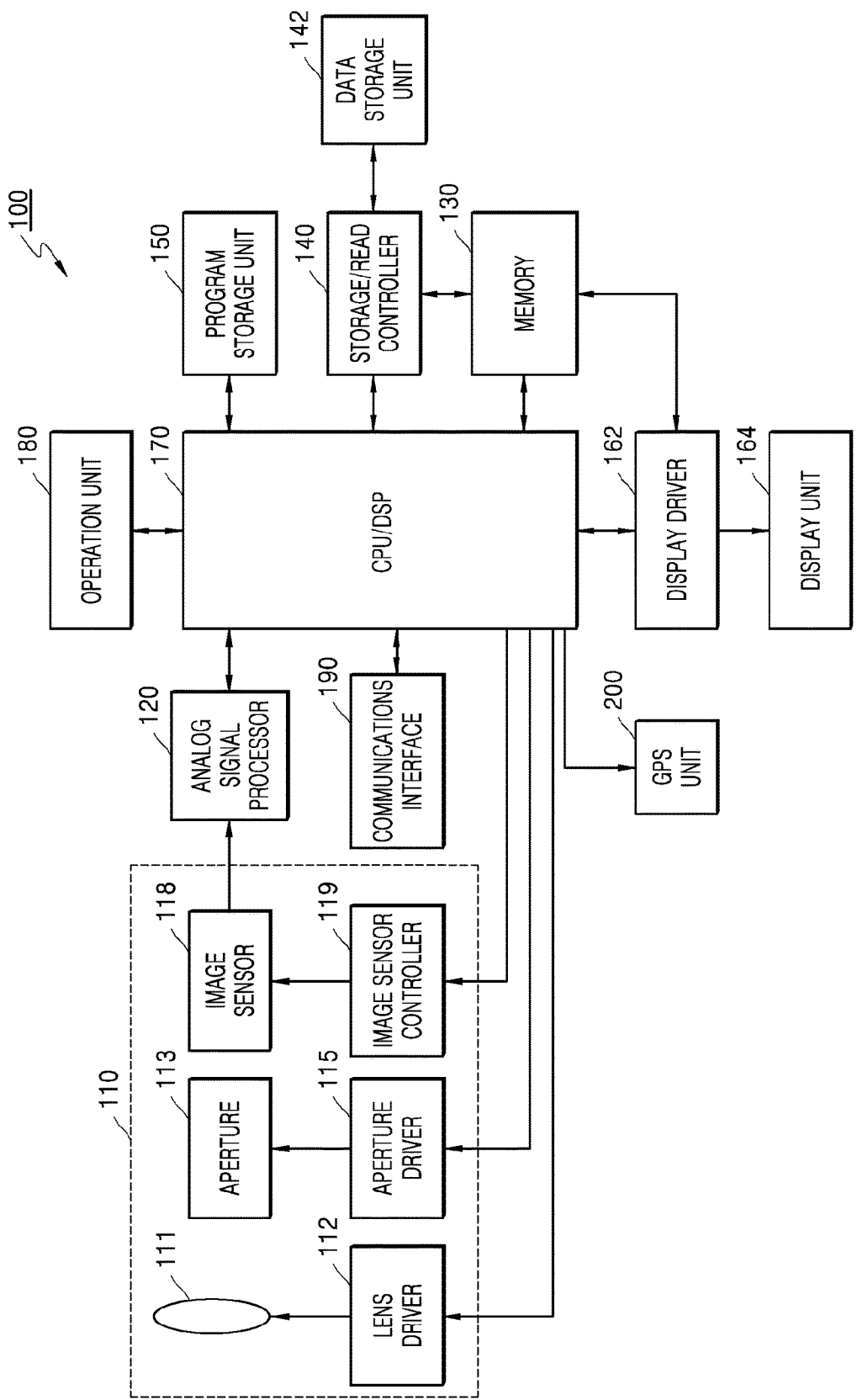
FIG. 1 is a block diagram illustrating a structure of a digital photographing apparatus according to an exemplary embodiment of the present general inventive concept.

Reference will now be made in detail to embodiments of the present general inventive concept, examples of which are illustrated in the accompanying drawings, wherein the like reference numerals refer to like elements throughout. In this regard, the present embodiments may have different forms and should not be construed as being limited to the descriptions set forth herein. Accordingly, the embodiments are merely described below by referring to the figures to explain features and utilities of the present general inventive concept.

The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

In addition, the terms such as "unit", "-er(-or)", and "module" described in the specification refer to an element to perform at least one function or operation, and may be implemented in hardware, software, or the combination of hardware and software.

As used herein, the term "an exemplary embodiment" or "embodiment" of the present general inventive concept refers to properties, structures, features, and the like, that are described with an embodiment that is included in at least one embodiment of the present general inventive concept. Thus, expressions such as "according to an exemplary embodiment" do not always refer to the same embodiment.

As used herein, the term "and/or" includes any and all combinations of one or more of the associated listed items. Expressions such as "at least one of," when preceding a list of elements, modify the entire list of elements and do not modify the individual elements of the list.

FIG. 1 illustrates a structure of a digital photographing apparatus 100 according to an exemplary embodiment of the present general inventive concept.

The digital photographing apparatus 100 according to an embodiment of the present general inventive concept includes a capturing unit 110, an analog signal processor 120, a memory 130, a storage read controller 140, a data storage unit 142, a program storage unit 150, a display driver 162, a display unit 164, a central processing unit/digital signal processor (CPU/DSP) 170, an operation unit 180, and may optionally include a communications interface 190 and a global positioning system (GPS) unit 200.

The overall operation of the digital photographing apparatus 100 is controlled by the CPU/DSP 170. The CPU/DSP 170 provides control signals to operate elements such as a lens driver 112, an aperture driver 115, and an image sensor controller 119.

The capturing unit 110 is an element to generate electric image signals from incident light. The capturing unit 110 includes a lens 111, the lens driver 112, an aperture 113, the aperture driver 115, an image sensor 118, and the image sensor controller 119.

The lens 111 may include a plurality of groups of lenses or a plurality of lenses. A position of the lens 111 is controlled by the lens driver 112. The lens driver 112 may include one or more circuits and/or electro-mechanical devices configured to control the position of the lens 111 according to control signals from the CPU/DSP 170.

The aperture 113, whose degree of opening is controlled by the aperture driver 115, adjusts an amount of light incident on the image sensor 118. The aperture driver 115 may include one or more circuits and/or electro-mechanical devices configured to control the aperture 113 according to control signals from the CPU/DSP 170.

Optical signals having passed through the lens 111 and the aperture 113 form an image of a subject upon reaching a light-receiving surface of the image sensor 118. The image sensor 118 may be, for example, a charge-coupled device (CCD) image sensor or a complementary metal-oxide semiconductor (CMOS) image sensor to convert optical signals into electric signals. A sensitivity of the image sensor 118 may be controlled by the image sensor controller 119. The image sensor controller 119 may include one or more circuits and/or electrical devices to control the image sensor 118 in real time according to control signals that are automatically generated in response to input image signals, or control signals that are manually input by a user.

An exposure time of the image sensor 118 is controlled by using a shutter (not illustrated). The shutter may comprise a mechanical shutter to adjust light incidence by physically closing the shutter, and/or an electronic shutter to adjust exposure by supplying electric signals. The exposure time is controlled according to a shutter speed. According to an exemplary embodiment of the present general inventive concept, the shutter speed may be controlled by the CPU/DSP 170 based on the amount of light incident on the image sensor 118.

The analog signal processor 120 performs noise reduction processing, gain adjustment, waveform shaping, analog-to-digital conversion, or the like on analog signals that are supplied by the image sensor 118.

The signals processed by the analog signal processor 120 may be input to the CPU/DSP 170 directly, or via the memory 130. The memory 130 may be implemented, for example, as a semiconductor memory, read-only-memory (ROM), random-access-memory (RAM), non-volatile random-access-memory (NVRAM), or flash memory. The memory 130 may function as a main memory of the digital photographing apparatus 100, and may temporarily store information required during an operation of the CPU/DSP 170. The program storage unit 150 stores programs to operate the digital photographing apparatus 100, such as an operation system, an application program, for example, an image editing program and/or image processing program and the like.

The digital photographing apparatus 100 includes the display unit 164 to display an operation status or information regarding an image captured by the digital photographing apparatus 100. The display unit 164 may provide visual information and/or auditory information to the user. In order to provide the visual information, the display unit 164 may include, for example, a liquid crystal display (LCD) panel, an organic light-emitting display panel, or the like. In order to provide auditory information, the display unit 164 may include an integrated or connected audio unit, such as one or more speakers, or the like. Also, the display unit 164 may be a touch screen that may detect touch inputs.

The display driver 162 may include one or more circuits to provide driving signals to the display unit 164.

The digital photographing apparatus may also include a communications interface 190 including one or more circuits and a transceiver to transmit and/or receive data wirelessly, for example, via Wi-Fi, radio frequency signals, or infra-red signals. The data may include, for example, digital image data such as images captured by capturing unit 110 and/or processed by CPU/DSP 170, control signals, and input signals. The interface 190 can be a wired and/or wireless communications interface.

The digital photographing apparatus may optionally include a global positioning system (GPS) unit 200 including an antenna, circuitry and a GPS receiver to receive and process location data. The CPU/DSP 170 can associate GPS data with images captured by capturing unit 110.

The CPU/DSP 170 processes image signals and external input signals, and controls each element according to the image signals or external input signals. The CPU/DSP 170 may reduce noise of image data, and may perform image signal processes to improve image quality, such as gamma correction, blur correction, motion correction, correct lens aberration, color filter array interpolation, color matrix, color correction, and color enhancement. Also, image data may be generated from the image signal processes to improve image quality. The image data may be compressed to generate an image file, from which the image data may also be restored. A compression format of the image data may be reversible or irreversible. An example of a compression format of still images is a Joint Photographic Experts Group (JPEG) format, or a JPEG 2000. When capturing moving images, a moving image file may be generated by compressing a plurality of frames according to a video compression standard, such as, for example, a Moving Picture Experts Group (MPEG) standard. The image file may be generated according to a file format standard, such as, for example, an Exchangeable image file format (Exif) standard.

The CPU/DSP 170 may generate a moving image file from imaging signals that are generated by the image sensor 118. The imaging signals may be signals that are generated by the image sensor 118 and processed by the analog signal processor 120. The CPU/DSP 170 may generate frames to be included in the moving image file from the imaging signals, may code the frames according to a standard such as Moving Picture Experts Group 4 (MPEG4), H.264/AVC, or windows media video (WMV), and may compress the frames so as to generate the moving image file. The moving image file may be generated in various formats such as, for example, mpg, mp4, 3gpp, avi, asf, or mov.

The image data that is output from the CPU/DSP 170 is input to the storage read controller 140 directly, or via the memory 130. The storage read controller 140 may store the image data in a data storage unit 142 automatically, or according to a signal input from the user. The data storage unit 142 may include, for example, a semiconductor memory or a flash memory. The storage read controller 140 may read the image data from the image file stored in the data storage unit 142, and may provide the image data to the display driver 162 via the memory 130 or another path, so as to display the image on the display unit 164. The data storage unit 142 may be a separable component, or a built-in component of the digital photographing apparatus 100.

The CPU/DSP 170 may also perform obscuring, coloring, blurring, edge enhancement, image analysis processing, image detection processing, image effect process, and the like. The image detection processing may be a face detection process, a scene detection process, or the like. Furthermore, the CPU/DSP 170 may process image signals to be displayed on the display unit 164. For example, brightness level adjustment, color correction, contrast adjustment, contour enhancement, screen division, character image generation, and combination of images may be performed. The CPU/DSP 170 may be connected to an external monitor (not illustrated). Once connected, the CPU/DSP 170 may perform a predetermined process on the image signals to be displayed on the external monitor, and transmit the processed image signals so that the processed image signals are displayed on the external monitor.

The CPU/DSP 170 may execute the programs stored in the program storage unit 150. The CPU/DSP 170 may include a separate module to generate control signals for auto focusing, zoom ratio changing, focus shifting, auto exposure correction, or the like. The CPU/DSP 170 may also provide control signals to the aperture driver 115, the lens driver 112, and the image sensor controller 119. Thus, the CPU/DSP 170 may control components of the digital photographing apparatus 100, such as the shutter, a strobe, and the like.

The user may input control signals via the operation unit 180. The operation unit 180 may include various functional buttons, such as a shutter-release button to input shutter-release signals to expose the image sensor 118 to light for a predetermined time period so as to capture an image, a power button to input control signals to control power on or off, a zoom button to widen or narrow an angle of view according to an input, a mode selection button, and other buttons to adjust capturing setting values. The operation unit 180 may be implemented in any form that allows the user to input control signals, such as, for example buttons, a keyboard, a touch pad, a touch screen, a computer, a tablet, a smartphone and/or a wired or wireless remote control device.

Hereinafter, with reference to FIGS. 2 to 7, a method of controlling the digital photographing apparatus 100, in which a read-out mode may be changed, according to an embodiment of the present general inventive concept, is described in detail.

Figure 2:
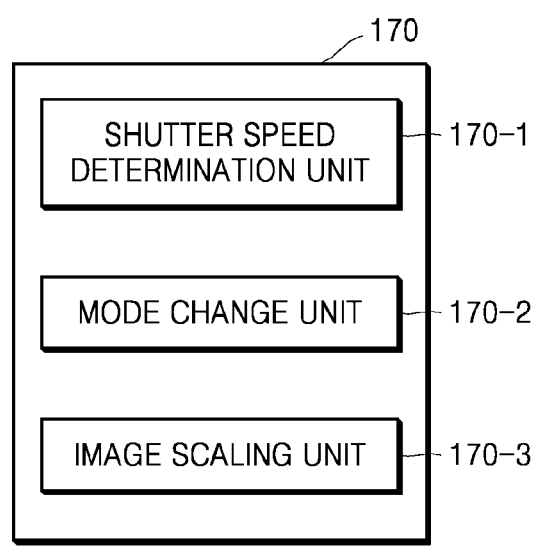
FIG. 2 is a block diagram illustrating a structure of a central processing unit/digital signal processor (CPU/DSP) according to an exemplary embodiment of the present general inventive concept.

FIG. 2 is a block diagram illustrating a structure of the CPU/DSP 170 according to an embodiment of the present general inventive concept.

Referring to FIG. 2, the CPU/DSP 170 according to an embodiment of the present general inventive concept may include a shutter speed determination unit 170-1, a mode change unit 170-2, and an image scaling unit 170-3.

The digital photographing apparatus 100 according to an embodiment of the present general inventive concept may capture a moving image having a predetermined frame rate in a first read-out mode.

The frame rate refers to a speed rate at which sequential images are captured or reproduced, i.e., frames per second (FPS). In general, a moving image may be captured at a frame rate of, for example, 24 FPS, 30 FPS, 60 FPS, or 120 FPS. As the frame rate increases, the moving image may be reproduced to appear more smoothly. For example, the digital photographing apparatus 100 according to an embodiment of the present general inventive concept may capture images at a frame rate of 60 FPS.

A read-out process refers to an operation of generating or converting image signals by reading-out image sensors. In general, when capturing a moving image, a frame of the moving image may have a lower resolution than a still image. Therefore, the read-out process may be performed in a 1 Read 2 Skip (1R2S) mode. For example, in the digital photographing apparatus 100 according to an exemplary embodiment of the present general inventive concept, a full high-definition (FHD) image may be captured by determining the first read-out mode as the 1R2S mode.

However, the read-out mode of the digital photographing apparatus 100 is not limited thereto. The read-out mode and the predetermined frame rate when capturing the moving image may be determined before capturing the moving image, based on user input. Since the read-out process and the frame rate are well known to one of ordinary skill in the art, detailed descriptions thereof will be omitted.

The shutter speed determination unit 170-1, according to an exemplary embodiment of the present general inventive concept, may include one or more circuits and/or software to estimate the brightness of the surroundings and determine the shutter speed of a frame to be currently captured based on the estimated brightness of the surroundings.

For example, an exposure time that is required to capture a current frame may be determined based on the intensity of light incident on an image sensor. The exposure time indicates a time period during which light is incident on the image sensor. The shutter speed determination unit 170-1 may adjust the exposure time according to the amount of light incident on the image sensor. The exposure time may be controlled according to the shutter speed.

The mode change unit 170-2 according to an exemplary embodiment of the present general inventive concept may include one or more circuits and/or software to determine whether or not the exposure time that corresponds to the shutter speed determined by the shutter speed determination unit 170-1 is longer than a predetermined time period. When the exposure time is longer than the predetermined time period, the first read-out mode may be changed to a second read-out mode that has a shorter read-out time than the first read-out mode.

The predetermined time period refers to a maximum exposure time to capture a moving image without changing a frame rate that is predetermined when capturing the moving image.

Specifically, the mode change unit 170-2 estimates a time allocated to each frame when capturing the moving image having the predetermined frame rate. When a total sum of the exposure time and a read-out time of the first read-out mode is longer than the time allocated to each frame, the first read-out mode may be changed to the second read-out mode.

In the second read-out mode, a rate of at least one line that is skipped in a horizontal direction (hereinafter, referred to as "horizontally skipped line rate") may be higher than a horizontally skipped line rate of the first read-out mode. Furthermore, in the second read-out mode, when the image sensor is read-out, a rate of at least one line that is skipped in a vertical direction (hereinafter, referred to as "vertically skipped line rate") may be higher than a vertically skipped line rate of the first read-out mode.

However, the second read-out mode is not limited thereto. The second read-out mode may indicate a mode having a shorter read-out time than the first read-out mode.

An operation of obtaining the shutter speed by changing the first read-out mode to the second read-out mode according to the brightness of the surroundings will be described hereinafter by referring to FIGS. 4 to 7.

Figure 4:
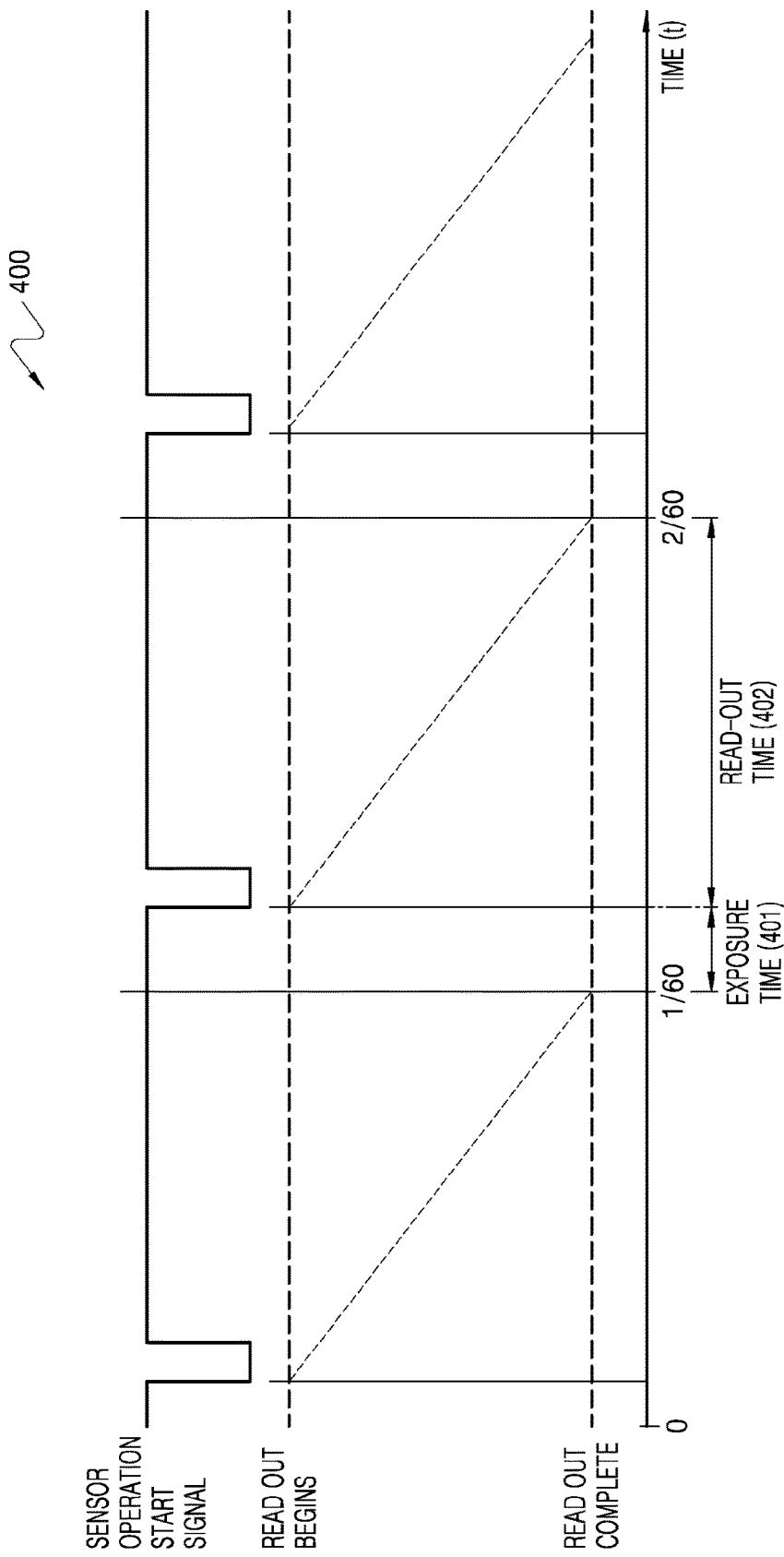
FIG. 4 is a timing diagram illustrating capturing of a moving image via the digital photographing apparatus in a first read-out mode when surroundings are bright, according to an exemplary embodiment of the present general inventive concept.

FIG. 4 is a timing diagram 400 illustrating capturing of a moving image via the digital photographing apparatus 100 in the first read-out mode when the surroundings are bright, according to an exemplary embodiment of the present general inventive concept.

Referring to the timing diagram 400 of FIG. 4, after an exposure time 401 that is dependent on the brightness of the surroundings of each frame elapses, the read-out process is performed according to a sensor operation start signal. Since the read-out process has to be finished before a light-exposure operation is performed in a following frame, a total sum of the exposure time 401 and a read-out time 402 of each frame has to be less than the time allocated to each frame.

For example, when the frame rate is 60 FPS, a frame has to be processed at $1/60$ of a second so that the total sum of the exposure time 401 and the read-out time 402 is less than $1/60$ of a second. Since the read-out time 402 is predetermined according to specifications of an image sensor, the read-out time 402 does not change in the related art. That is, when the read-out time 402 is $1/120$ of a second in the first read-out mode, the exposure time 401 has to be less than $1/120$ of a second in order to capture at the frame rate of 60 FPS.

Figure 5:
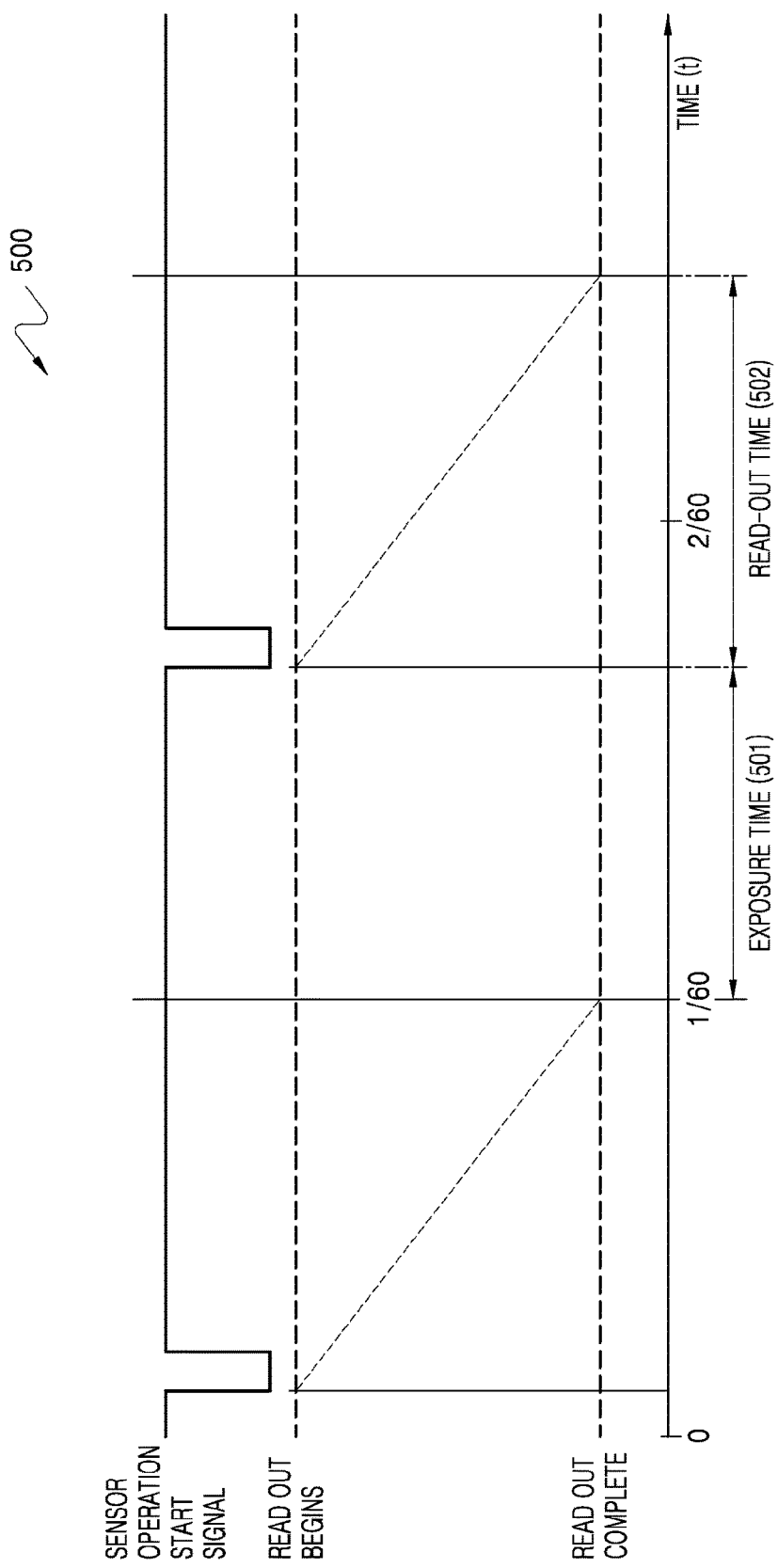
FIG. 5 is a timing diagram illustrating capturing of a moving image via the digital photographing apparatus in the first read-out mode when the surroundings are dark, according to an exemplary embodiment of the present general inventive concept.

FIG. 5 is a timing diagram 500 illustrating capturing of a moving image via the digital photographing apparatus 100 in the first read-out mode when the surroundings are dark, according to an exemplary embodiment of the present general inventive concept.

Referring to the timing diagram 500 of FIG. 5, the shutter speed determination unit 170-1 may determine a low shutter speed when the surroundings turn dark. Accordingly, FIG. 5 illustrates that the exposure time 501 is increased compared to the exposure time 401 of FIG. 4. In this example, the total sum of the exposure time (501) and the read-out time (502) now exceeds $1/60$ of a second. However, as described with reference to FIG. 4, the increase of the exposure time 501 may be limited so that the frame rate is maintained while capturing the moving image. That is, when a read-out time 502 is $1/120$ of a second in the first read-out mode, the exposure time 501 may not be greater than $1/120$ of a second so as to capture at the frame rate of 60 FPS. Therefore, in the related art, the frame rate would be temporarily changed in order to obtain the exposure time 501. For example, the frame rate of 60 FPS would be reduced to a frame rate of 30 FPS. Since the time allocated to each frame would increase from $1/60$ of a second to $1/30$ of a second, the exposure time 501 could be obtained. However, since the frame rate would be changed while capturing, parallax of the moving image may increase, and the moving image may not be smoothly reproduced.

Therefore, instead of changing the frame rate, the mode change unit 170-2 according to an exemplary embodiment of the present general inventive concept changes the read-out mode to a second read-out mode having a read-out time 602 that is shorter than the first read-out mode so that an exposure time 601 may be obtained.

Figure 6:
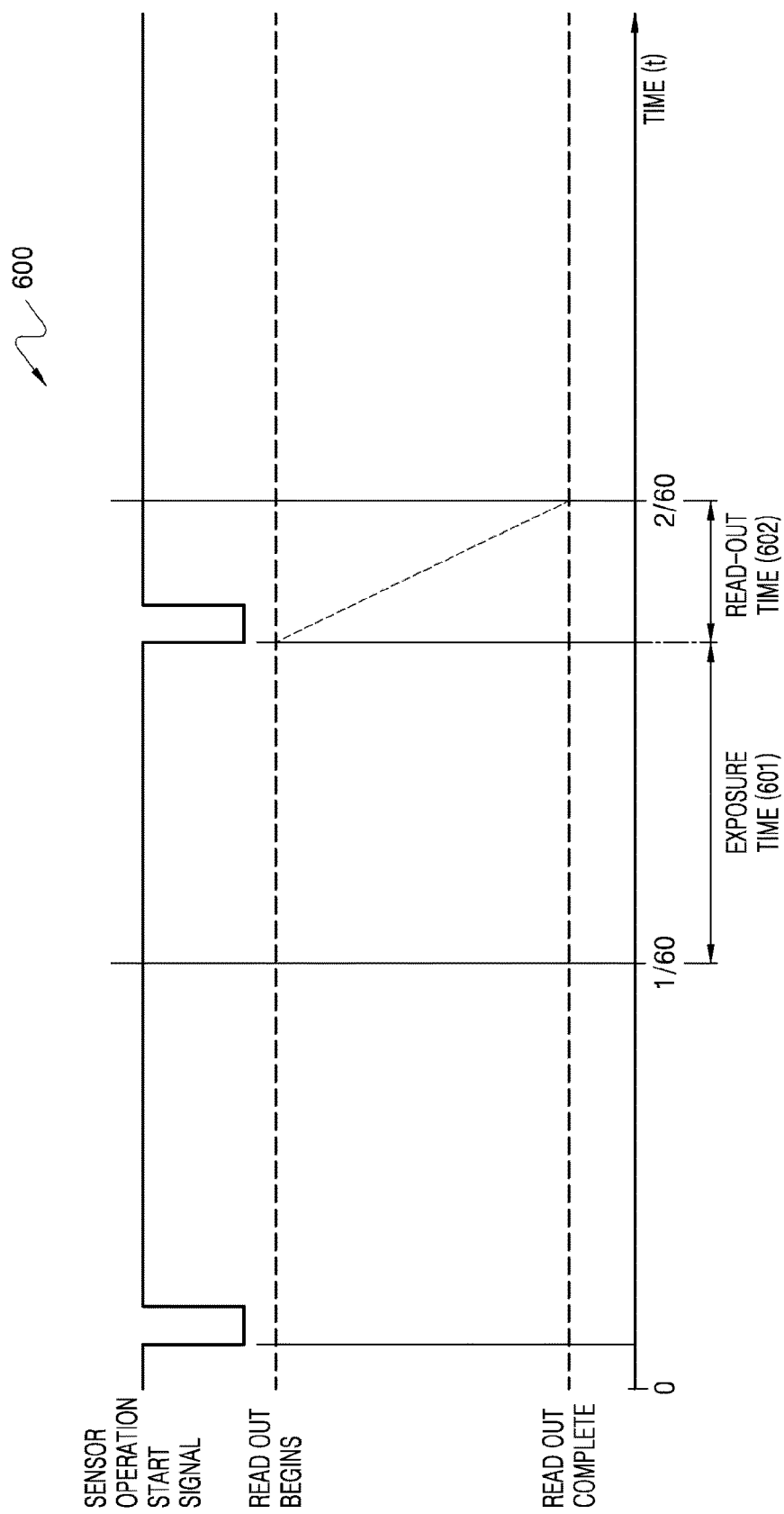
FIG. 6 is a timing diagram illustrating capturing of a moving image via the digital photographing apparatus in a second read-out mode when the surroundings are, according to an exemplary embodiment of the present general inventive concept.

FIG. 6 is a timing diagram 600 illustrating capturing of a moving image via the digital photographing apparatus 100 in the second read-out mode when the surroundings are dark, according to an exemplary embodiment of the present general inventive concept.

Referring to FIG. 6, the mode change unit 170-2 changes the read-out mode from the first read-out mode to the second read-out mode. Thus, the read-out time 602 is reduced, for example, such that the total sum of the exposure time (601) and read-out time (602) no longer exceeds $1/60$ of a second.

For example, when the first read-out mode is the 1R2S mode and the second read-out mode is a 1 read 4 skip (1R4S) mode, the read-out time 602 decreases by about 60%. Therefore, the exposure time 601 may be about 2.5 times greater than a maximum value of the exposure time 501 of the first read-out mode.

A frame captured in the 1R4S mode may have a lower resolution than a frame captured in the 1R2S mode. Thus, an image interpolation process may be performed so that a resolution of the frame captured in the 1R4S mode equals or approximates that of the frame captured in the 1R2S mode.

Figure 7A:
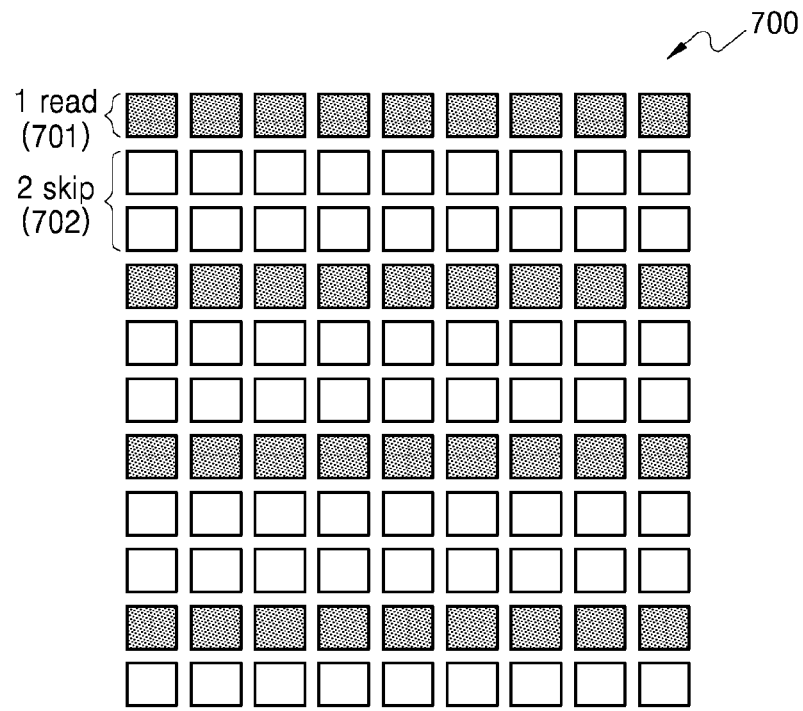
FIGS. 7A and 7B are views illustrating an example of a read-out mode of the digital photographing apparatus, according to an exemplary embodiment of the present general inventive concept.
Figure 7B:
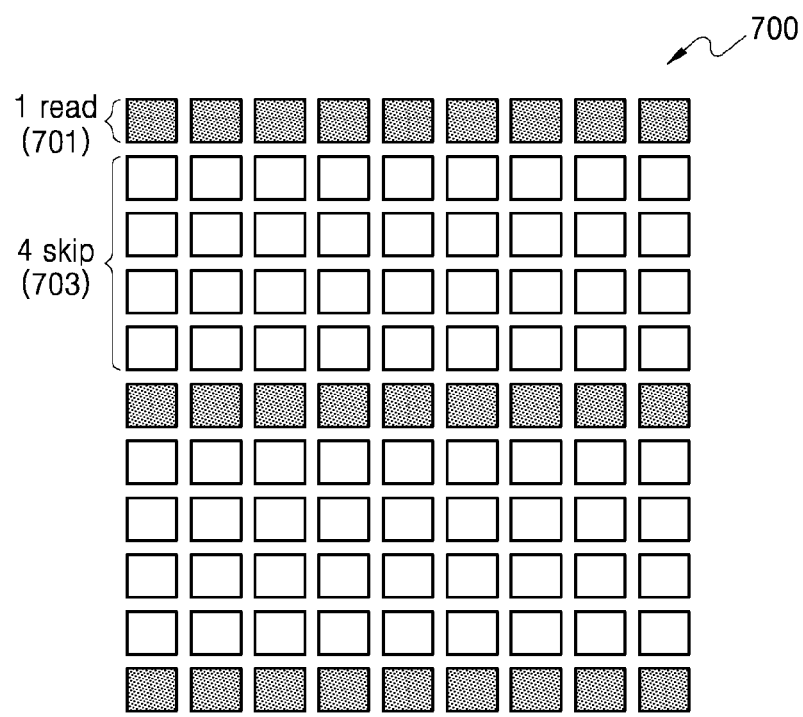

FIGS. 7A and 7B are views illustrating an example of the read-out mode of the digital photographing apparatus 100, according to an exemplary embodiment of the present general inventive concept.

FIG. 7A illustrates an example of reading-out image sensors 700 in the 1R2S mode. FIG. 7B illustrates an example of reading-out the image sensors 700 in the 1R4S mode.

As illustrated in FIG. 7A, in the 1R2S mode, the read-out process may be performed by reading (read 701) a single line, and then skipping (skip 702) two lines.

Also, as illustrated in FIG. 7B, in the 1R4S mode, the read-out process may be performed by reading (read 701) a single line, and then skipping (skip 703) four lines.

Therefore, when the first read-out mode is the 1R2S mode and the second read-out mode is the 1R4S mode, the number of pixels that are read-out in the second read-out mode decreases by about 40%, compared to the first read-out mode. Thus, a read-out time of the second read-out mode may decrease by about 60%, compared to the first read-out mode. That is, as described with reference to FIG. 6, the exposure time 601 may be about 2.5 times greater than the maximum value of the exposure time 501 of the first read-out mode.

However, the first read-out mode and the second read-out mode are not limited thereto. A read-out mode in which the exposure time may be obtained for a shorter or longer period of time may be determined as the second read-out mode.

For example, when a long exposure time is required according to the brightness of the surroundings, the read-out time may be reduced by horizontally and vertically performing the read-out process in the 1R4S mode.

A frame captured in the second read-out mode may have a lower resolution than a frame captured in the first read-out mode. Thus, an image interpolation process may be performed so that a resolution of the frame captured in the first read-out mode equals or approximates that of the frame captured in the second read-out mode.

Referring back to FIG. 2, the image scaling unit 170-3 may upscale a size of a read-out image of the second read-out mode so that the size of the read-out image equals or approximates a size of a read-out image of the first read-out mode. Compared to the first-read out mode, although the read-out time is shorter in the second read-out mode due to a higher line skip rate, the second read-out image may have a lower resolution. Therefore, the image scaling unit 170-3 may upscale the read-out image of the second read-out mode so that a resolution of the read-out image of the second read-out mode equals or approximates a resolution of the read-out image of the first read-out mode.

Since methods of upscaling an image are well known to one of ordinary skill in the art, a detailed description of such methods will be omitted.

Figure 3:
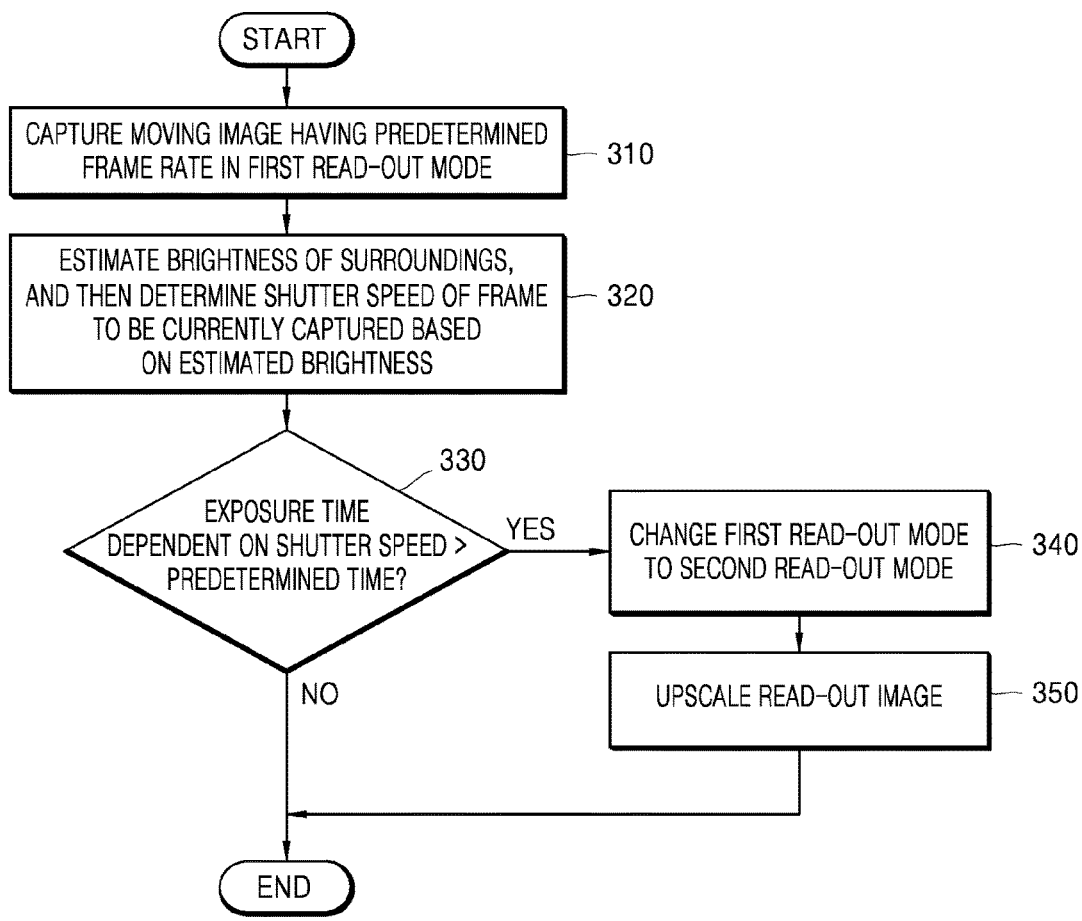
FIG. 3 is a flowchart illustrating a method of controlling the digital photographing apparatus, according to an exemplary embodiment of the present general inventive concept.

FIG. 3 illustrates a flowchart of a method of controlling the digital photographing apparatus 100, according to an exemplary embodiment of the present general inventive concept.

Referring to FIG. 3, the method of controlling the digital photographing apparatus 100 includes operations that may be sequentially performed by the digital photographing apparatus 100 and the CPU/DSP 170 of FIGS. 1 and 2. Therefore, the above-described features and elements of the digital photographing apparatus 100 and the CPU/DSP 170 of FIGS. 1 and 2 may apply to the method of FIG. 3.

In operation 310, the digital photographing apparatus 100 according to an exemplary embodiment of the present general inventive concept may capture the moving image having the predetermined frame rate in the first read-out mode.

In operation 320, the shutter speed determination unit 170-1 according to an exemplary embodiment of the present general inventive concept may estimate the brightness of the surroundings and determine the shutter speed of the frame to be currently captured based on the estimated brightness of the surroundings.

In operation 330, the mode change unit 170-2 according to an exemplary embodiment of the present general inventive concept determines whether or not the exposure time that is dependent on the shutter speed determined by the shutter speed determination unit 170-1 is longer than a predetermined time period.

When the exposure time is equal to or shorter than the predetermined time period, a current read-out mode is maintained. However, when the exposure time is longer than the predetermined time period, in operation 340, the mode change unit 170-2 according to an exemplary embodiment of the present general inventive concept may change the first read-out mode to the second read-out mode that has a shorter read-out time.

In another embodiment, the mode change unit 170-2 according to an embodiment of the present general inventive concept may count the number of frames in which the exposure time is longer than the predetermined time period. When the counted number of frames is greater than a predetermined number, the first read-out mode may be changed to the second read-out mode. In other words, when the surroundings momentarily turn dark or a brightness sensor malfunctions, the mode change unit 170-2 may count the number of frames in which the changed exposure time has to be obtained, and when the number of frames is greater than the predetermined number, the mode change unit 170-2 may change the first read-out mode to the second read-out mode.

In operation 350, the image scaling unit 170-3 according to an exemplary embodiment of the present general inventive concept may upscale the size of the read-out image of the second read-out mode so that the size of the read-out image of the second read-out mode equals or approximates the size of the read-out image of the first read-out mode.

Although not illustrated in FIG. 3, when the surroundings turn bright while capturing the moving image in the second read-out mode, and it is not necessary to obtain a relatively high shutter speed (i.e., the required exposure time is short), the mode change unit 170-2 may change the second read-out mode to the first read-out mode.

As described above, by using the method of controlling the digital photographing apparatus 100, according to an exemplary embodiment of the present general inventive concept, the exposure time may be obtained by changing the read-out mode according to the brightness of the surroundings. Therefore, the exposure time (i.e., the shutter speed) may be obtained without changing the frame rate.

Although first and second read-out modes are described above, the present general inventive concept is not limited thereto. For example, a plurality of three or more read-out modes may be available. The mode change unit 170-2 may select among the plurality of read-out modes according to predetermined criteria or criteria designated by a user. For example, the mode change unit 170-2 may select a read-out mode which provides the highest possible frame resolution without changing the frame rate.

Figure 8:
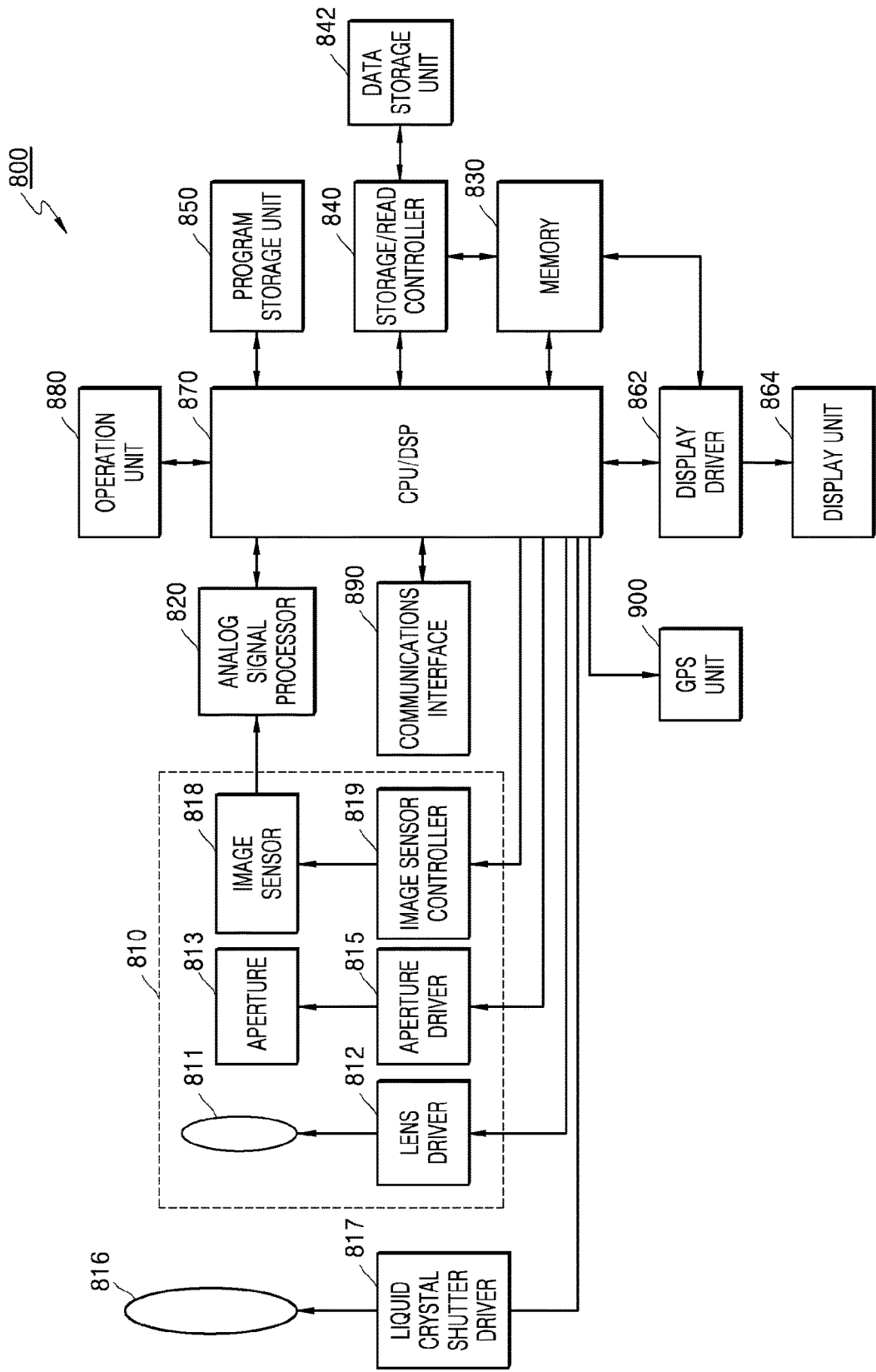
FIG. 8 is a block diagram illustrating a structure of a digital photographing apparatus according to an exemplary embodiment of the present general inventive concept.

FIG. 8 is a block diagram illustrating a structure of a digital photographing apparatus 800 according to another exemplary embodiment of the present general inventive concept.

Since the digital photographing apparatus 800 of FIG. 8 is similar to the digital photographing apparatus 100 of FIG. 1, only the difference therebetween will be described.

Referring to FIG. 8, the digital photographing apparatus 800 according to an exemplary embodiment of the present general inventive concept may further include a liquid crystal shutter 816 for 3-dimensional (3D) photography, and a liquid crystal shutter driver 817

Figure 9:
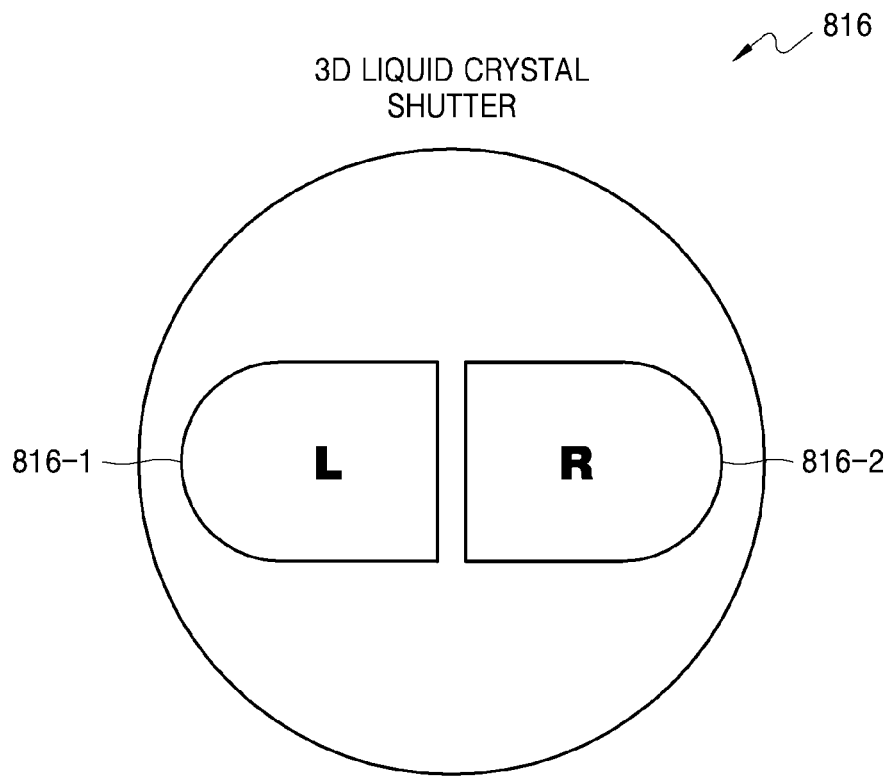
FIG. 9 is a block diagram illustrating a 3-dimensional (3D) liquid crystal shutter of the digital photographing apparatus, according to an exemplary embodiment of the present general inventive concept.

As illustrated in FIG. 9, the liquid crystal shutter 816 according to an exemplary embodiment of the present general inventive concept may include a left (L) liquid crystal shutter 816-1 and a right (R) liquid crystal shutter 816-2. Therefore, the L and R liquid crystal shutters 816-1 and 816-2 may be respectively turned on/off for each frame to capture a 3D moving image.

The liquid crystal shutter driver 817 according to an exemplary embodiment of the present general inventive concept may use a rolling shutter type sensor to turn on/off the L and R liquid crystal shutters 816-1 and 816-2. However, when a rolling shutter type sensor is used, a time period that elapses while changing the L and R liquid crystal shutters 816-1 and 816-2 (hereinafter, referred to as "liquid crystal shutter change timing") may be long.

When a 3D moving image is captured using a single image sensor, images are acquired respectively from left and right. Accordingly, the images need to have a high frame rate. However, due to the liquid crystal shutter change timing, it is difficult to obtain the required shutter speed.

As described with reference to FIGS. 1 to 7, when the digital photographing apparatus 100 according to an exemplary embodiment of the present general inventive concept captures the moving image, the exposure time is obtained with respect to the read-out time. However, when the digital photographing apparatus 800 according to an embodiment of the present general inventive concept captures the moving image, the liquid crystal shutter change timing during 3D photography may also be regarded.

Hereinafter, a detailed method of controlling the digital photographing apparatus 800 in which the read-out mode may be changed, according to an exemplary embodiment of the present general inventive concept, will be described with reference to FIGS. 10 to 14. The features that are similar to the description with reference to FIGS. 1 to 7 will be omitted.

Figure 10:
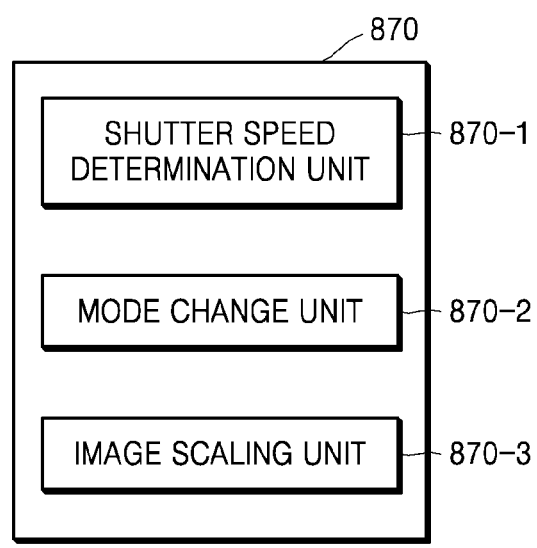
FIG. 10 is a block diagram illustrating a structure of a CPU/DSP according to an exemplary embodiment of the present general inventive concept.

FIG. 10 is a block diagram illustrating a structure of a CPU/DSP 870 according to an exemplary embodiment of the present general inventive concept.

Since the CPU/DSP 870 of FIG. 10 is similar to the CPU/DSP 170 of FIG. 2, only the difference therebetween is described.

First, the digital photographing apparatus 800 according to an exemplary embodiment of the present general inventive concept may capture a 3D moving image having a predetermined frame rate in a first read-out mode.

A mode change unit 870-2 according to an exemplary embodiment of the present general inventive concept may estimate a time allocated to each frame when capturing the 3D moving image having the predetermined frame rate. When a total sum of a determined exposure time, the liquid crystal shutter change timing, and a read-out time of the first read-out mode is longer than the time allocated to each frame, the first read-out mode may be changed to a second read-out mode.

Figure 12:
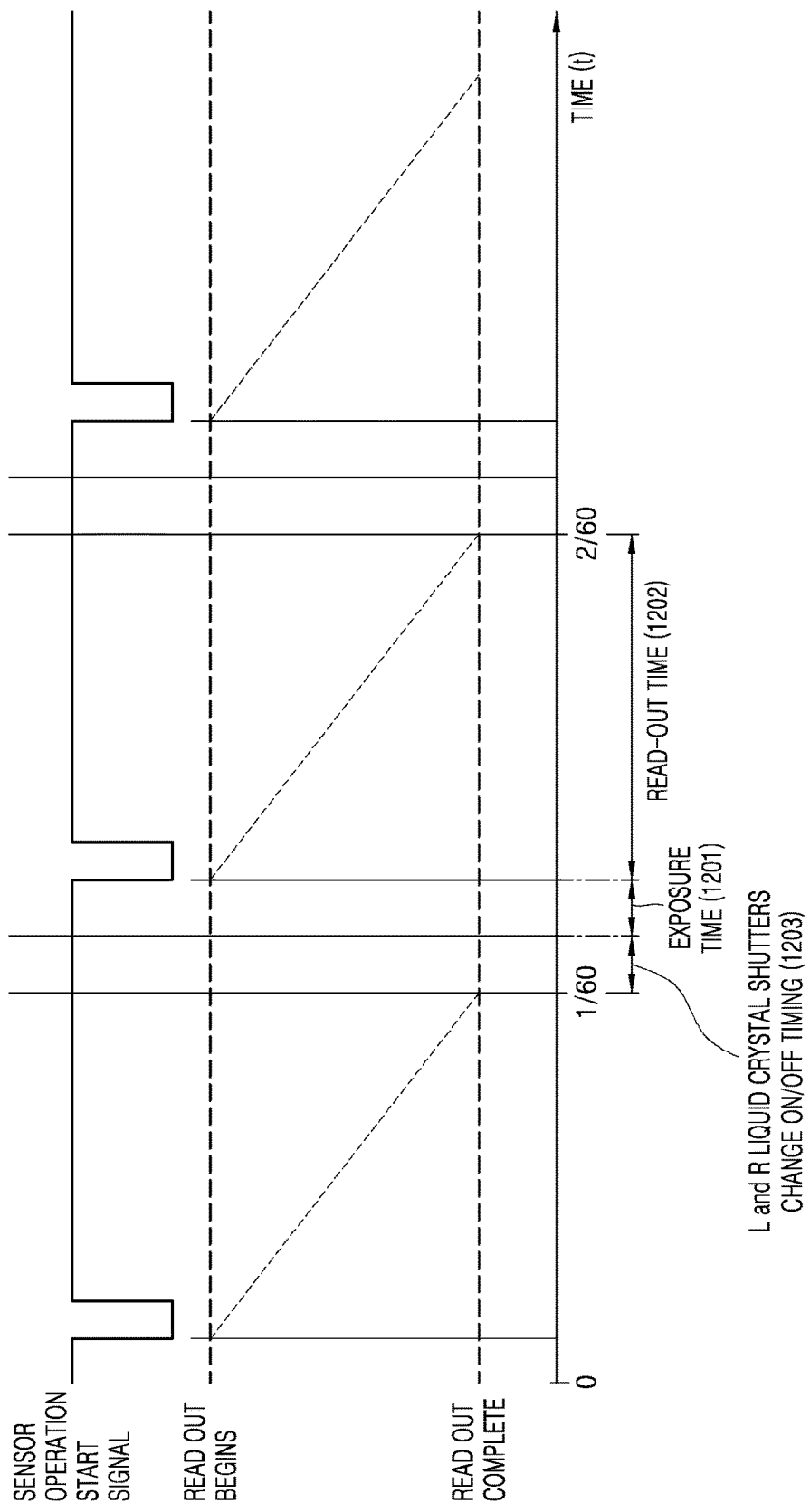
FIG. 12 is a timing diagram illustrating capturing of a 3D moving image via the digital photographing apparatus in a first read-out mode when surroundings are bright, according to an exemplary embodiment of the present general inventive concept.

FIG. 12 is a timing diagram illustrating capturing of a 3D moving image via the digital photographing apparatus 800 in the first read-out mode when the surroundings are bright, according to an embodiment of the present general inventive concept.

Referring to FIG. 12, after an exposure time 1201 that is dependent on the brightness of the surroundings of each frame elapses, the read-out process is performed, which is the same as in the timing diagram 400 of FIG. 4. However, in the present embodiment, during the time allocated to each frame, a time period that elapses while turning on/off the L and R liquid crystal shutters 816-1 and 816-2 (hereinafter, referred to as "L and R liquid crystal shutters change on/off timing") to capture the 3D moving image is also included.

Therefore, only when a total sum of the exposure time 1201, the L and R liquid crystal shutters change on/off timing 1203, and a read-out time 1202 is shorter than the time allocated to each frame may the 3D moving image be captured at the predetermined frame rate.

For example, when the frame rate is 60 FPS (L and R liquid crystal shutters 816-1 and 816-2 respectively have a frame rate of 30 FPS), a single frame has to be processed at ¹⁄₆₀ of a second so that a total sum of the exposure time 1201, a read-out time 1202 and a L and R liquid crystal shutters change on/off timing 1203 has to be less than ¹⁄₆₀ of a second. The read-out time 1202 is predetermined according to specifications of an image sensor. Therefore, in general, when capturing at a frame rate of 60 FPS in high-definition (HD) image quality, the exposure time has to be shorter than ¹⁄₁₈₀ of a second.

However, when the surroundings turn dark while capturing the 3D moving image, the required exposure time may be longer than ¹⁄₁₈₀ of a second.

Figure 13:
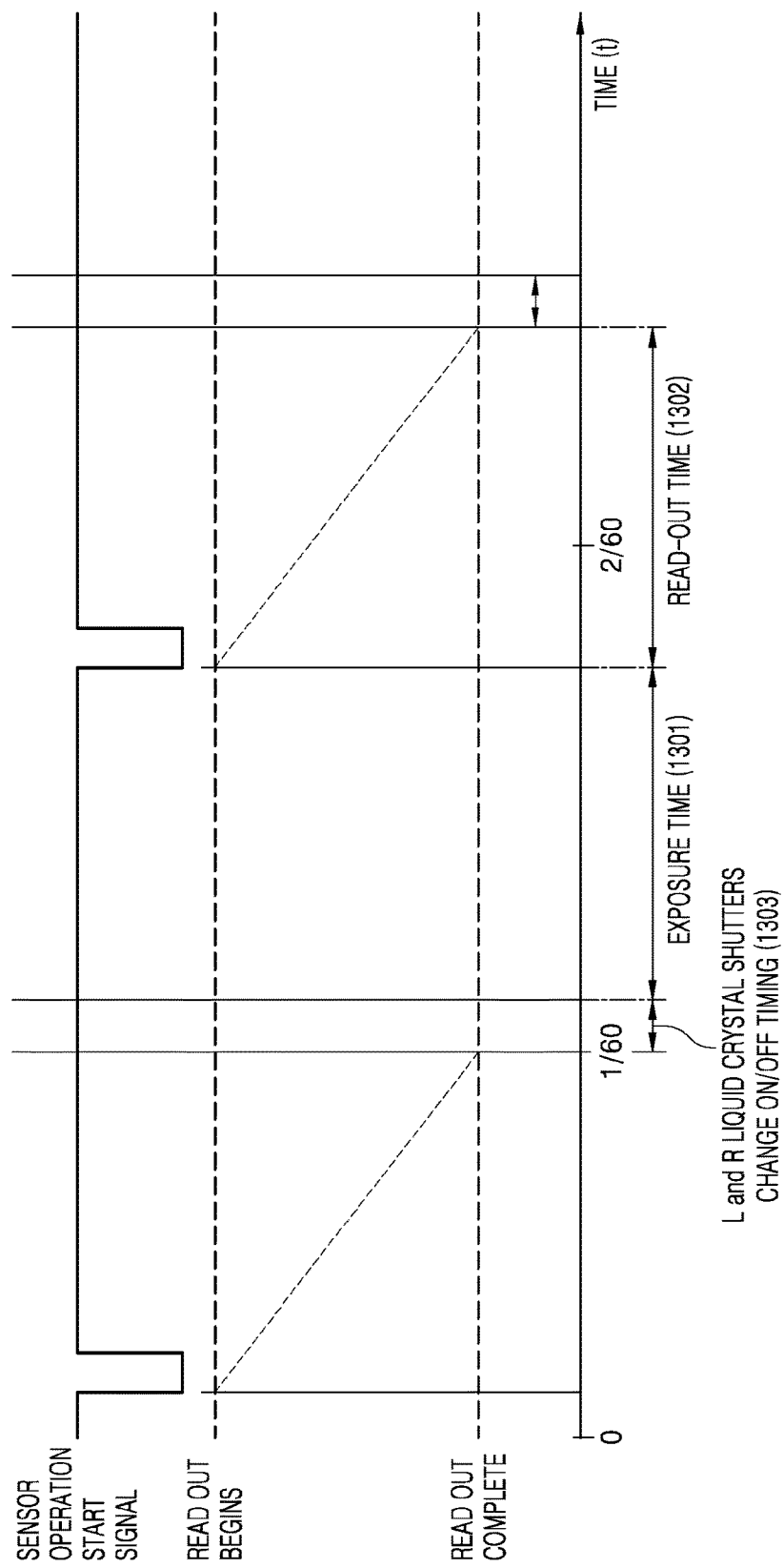
FIG. 13 is a timing diagram illustrating capturing of a 3D moving image via the digital photographing apparatus in the first read-out mode when the surroundings are, according to an exemplary embodiment of the present general inventive concept.

FIG. 13 is a timing diagram illustrating capturing of a 3D moving image via the digital photographing apparatus 800 in the first read-out mode when the surroundings are dark, according to an exemplary embodiment of the present general inventive concept.

Referring to the timing diagram shown in FIG. 13, a shutter speed determination unit 870-1 may determine to capture a current frame at a low shutter speed when the surroundings turn dark. Accordingly, FIG. 13 illustrates that an exposure time 1301 is increased compared to the exposure time 1201 of FIG. 12. However, as described with reference to FIG. 12, the increase of the exposure time 1301 may be limited so that the frame rate is maintained while capturing the moving image. That is, the 3D moving image may be captured at the frame rate of 60 FPS only when the exposure time 1301 of the first read-out mode is less than ¹⁄₁₈₀ of a second. Therefore, in the related art, the frame rate would be temporarily changed in order to obtain the required exposure time 1301. For example, the frame rate of 60 FPS would be reduced to the frame rate of 30 FPS. Thus, since the time allocated to each frame would increase from ¹⁄₆₀ of a second to ¹⁄₃₀ of a second, the required exposure time 1301 may be obtained. However, since the frame rate would change while capturing, parallax of the 3D moving image may increase, and thus cause visual inconvenience to the user.

Therefore, instead of changing the frame rate, a mode change unit 870-2 according to an embodiment of the present general inventive concept changes the read-out mode to a second read-out mode having a read-out time 1402 that is shorter than the read-out time of the first read-out mode so that the required exposure time 1401 may be obtained without compromising the frame rate.

Figure 14:
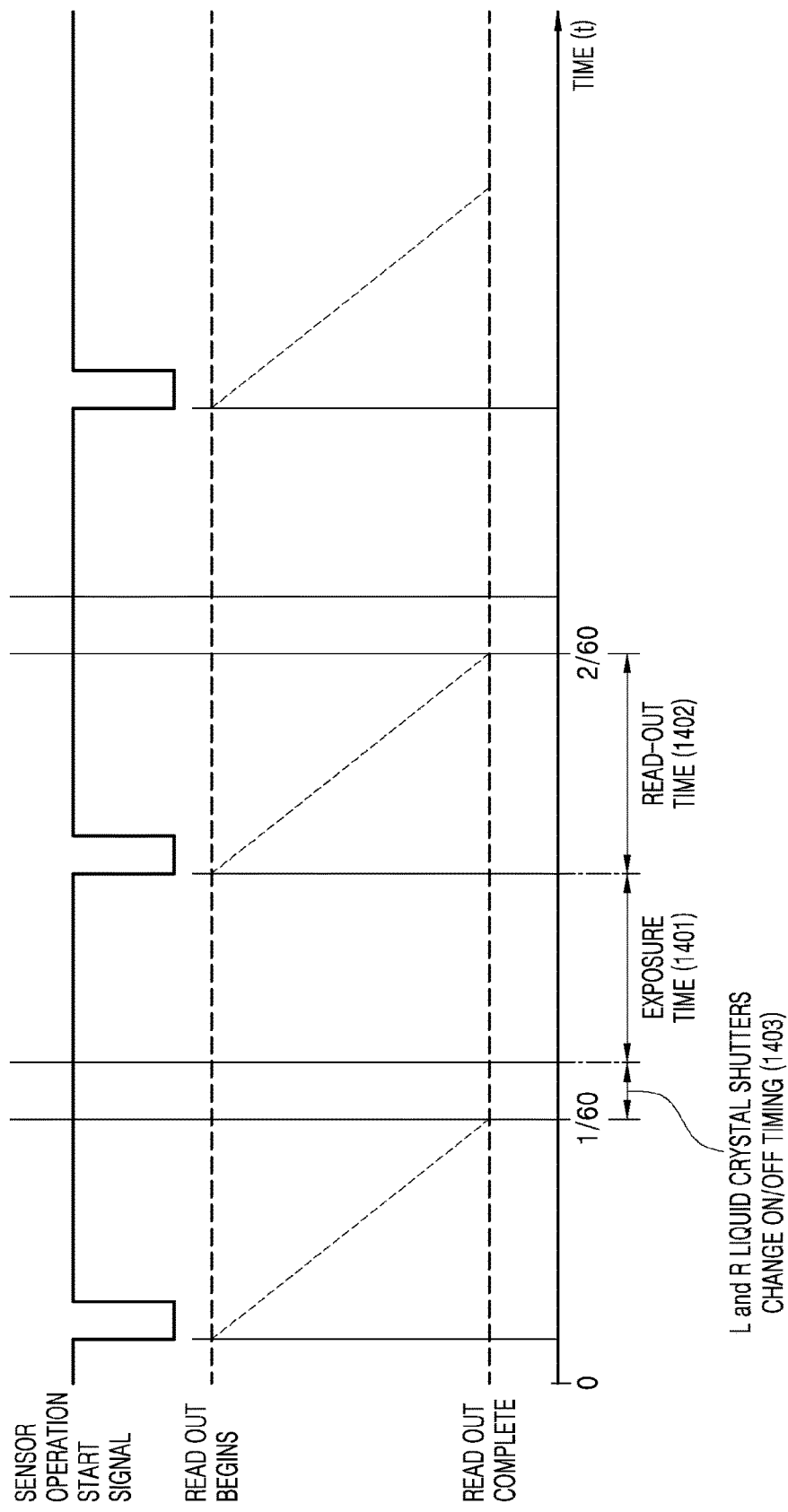
FIG. 14 is a timing diagram illustrating capturing of a 3D moving image via the digital photographing apparatus in a second read-out mode when the surroundings are dark, according to an exemplary embodiment of the present general inventive concept.

FIG. 14 is a timing diagram illustrating capturing of a 3D moving image via the digital photographing apparatus 800 in the second read-out mode when the surroundings are dark according to an exemplary embodiment of the present general inventive concept.

Referring to FIG. 14, the mode change unit 870-2 may change the read-out mode from the first read-out mode to the second read-out mode, and thus reduce the read-out time 1402

For example, when the first read-out mode is the 1R2S mode and the second read-out mode is the 1R4S mode, the read-out time 1402 may decrease by about 60%. Therefore, even without changing the frame rate, the exposure time 1401 may be about 2.5 times greater than a maximum value of the exposure time 1301 which is possible when using the first read-out mode.

A frame captured in the 1R4S mode may have a lower resolution than a frame captured in the 1R2S mode. Thus, an image interpolation process may be performed so that a resolution of a frame captured in the 1R4S mode equals or approximates that of a frame captured in the 1R2S mode.

Figure 11:
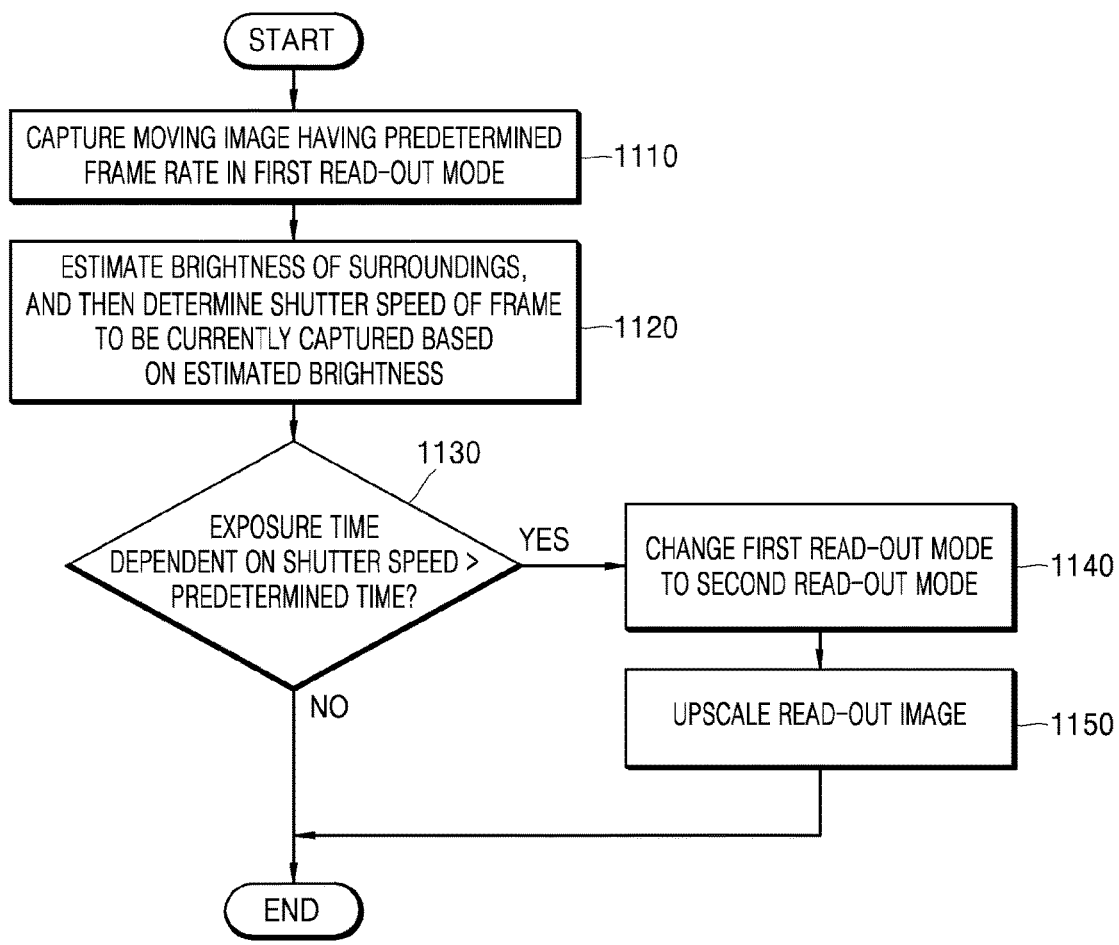
FIG. 11 is a flowchart illustrating a method of controlling the digital photographing apparatus, according to an exemplary embodiment of the present general inventive concept.

FIG. 11 is a method of controlling the digital photographing apparatus 800, according to an exemplary embodiment of the present general inventive concept.

Referring to FIG. 11, in operation 1110, the digital photographing apparatus 800 according to an exemplary embodiment of the present general inventive concept may capture a 3D moving image having a predetermined frame rate in a first read-out mode.

In operation 1120, the shutter speed determination unit 870-1 according to an exemplary embodiment of the present general inventive concept may estimate the brightness of the surroundings and determine the shutter speed of the frame to be currently captured based on the estimated brightness of the surroundings.

In operation 1130, the mode change unit 870-2 according to an embodiment of the present general inventive concept determines whether or not the exposure time that is dependent on the shutter speed determined by the shutter speed determination unit 870-1 is longer than the predetermined time period.

Specifically, the mode change unit 870-2 according to an exemplary embodiment of the present general inventive concept may estimate a time allocated to each frame when capturing the 3D moving image having the predetermined frame rate. When a total sum of the determined exposure time, a liquid crystal shutter change timing, and a read-out time of the first read-out mode is longer than the time allocated to each frame, the first read-out mode may be changed to a second read-out mode.

When the exposure time is equal to or shorter than the predetermined time period, a current read-out mode is maintained. However, when the exposure time is longer than the predetermined time period, in operation 1140, the mode change unit 870-2 according to an exemplary embodiment of the present general inventive concept may change the first read-out mode to the second read-out mode that has a shorter read-out time.

As another example, the mode change unit 870-2 according to another embodiment of the present general inventive concept may count the number of frames in which the exposure time is longer than the predetermined time period. When the counted number of frames is greater than a predetermined number, the first read-out mode may be changed to the second read-out mode. In other words, when the surroundings momentarily turn dark or a brightness sensor malfunctions, the mode change unit 870-2 may count the number of frames in which the required exposure time has to be obtained, and when the number of frames is greater than the predetermined number, the mode change unit 870-2 may change the first read-out mode to the second read-out mode.

In operation 1150, an image scaling unit 870-3 according to an exemplary embodiment of the present general inventive concept may upscale the size of the read-out image of the second read-out mode so that the size and/or resolution of the second read-out image equals or approximates the size and/or resolution of the read-out image of the first read-out mode.

As described above, by using a method of controlling a digital photographing apparatus, according to one or more of the exemplary embodiments of the present general inventive concept, when capturing a moving image, a read-out mode may be changed according to the brightness of surroundings to obtain a required exposure time. Therefore, the exposure time (i.e., shutter speed) may be obtained without changing a frame rate.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include a semiconductor memory device, a read-only memory (ROM), a random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains It should be understood that the exemplary embodiments described therein should be considered in a descriptive sense only and not for purposes of limitation. Descriptions of features or utilities within each embodiment should typically be considered as available for other similar features or utilities in other embodiments.

While one or more embodiments of the present general inventive concept have been described and shown with reference to the figures, it will be understood by those of ordinary skill in the art that various changes in form and details may be made therein without departing from the spirit and scope of the present general inventive concept as defined by the following claims and their equivalents.

What is claimed is:

1. A method of controlling a digital photographing apparatus in which a read-out mode is changed while capturing a moving image, the method comprising:
capturing a moving image with a predetermined frame rate in a first read-out mode;
estimating a brightness of surroundings;
determining a shutter speed for a frame of the moving image to be currently captured, based on the estimated brightness of the surroundings;
determining whether or not an exposure time, for capturing the moving image, that is dependent on the shutter speed is longer than a predetermined time period; and
changing the first read-out mode to a second read-out mode that has a shorter read-out time than a read-out time of the first read-out mode so that the predetermined frame rate is maintained when determining that the exposure time is longer than the predetermined time period,
wherein the determining of whether or not the exposure time, for capturing the moving image, that is dependent on the shutter speed is longer than the predetermined time period comprises:
estimating a time allocated to each frame when capturing the moving image having the predetermined frame rate; and
determining whether or not the exposure time is longer than the predetermined time period when a sum total of the exposure time and a read-out time of the first read-out mode is longer than the time allocated to each frame.

2. The method of claim 1, further comprising:
upscaling a size of a read-out image of the second read-out mode so that the size of the read-out image of the second read-out mode equals a size of a read-out image of the first read-out mode.

3. The method of claim 1, wherein the predetermined time period is a maximum possible exposure time to capture the moving image without changing the predetermined frame rate.

4. The method of claim 1, wherein when reading-out is performed by image sensors in the second read-out mode, a horizontally skipped line rate of the second read-out mode is higher than a horizontally skipped line rate of the first read-out mode.

5. The method of claim 4, wherein when the reading-out is performed by the image sensors in the second read-out mode, a vertically skipped line rate of the second read-out mode is higher than a vertically skipped line rate of the first read-out mode.

6. The method of claim 1, wherein the changing of the first read-out mode to the second read-out mode comprises:
counting a number of frames in which the exposure time is longer than the predetermined time period; and
changing the first read-out mode to the second read-out mode when the counted number of the frames is greater than a predetermined number of frames.

7. The method of claim 1, wherein the capturing of the moving image comprises capturing a 3-dimensional (3D) moving image having a predetermined frame rate in the first read-out mode.

8. The method of claim 7, wherein, for the 3D moving image, the determining of whether or not the exposure time that is dependent on the shutter speed is longer than the predetermined time period comprises:
estimating a time allocated to each frame when capturing the 3D moving image having the predetermined frame rate; and
determining whether or not the exposure time is longer than the predetermined time period when a sum total of the exposure time, a left liquid crystal shutter change timing, a right liquid crystal shutter change timing, and a read-out time of the first read-out mode, is longer than the time allocated to each frame.

9. A digital photographing apparatus in which a read-out mode is changed while capturing a moving image with a predetermined frame rate in a first read-out mode, the digital photographing apparatus comprising:
at least one memory storing instructions; and
at least one processor executing the instructions and comprising:
a shutter speed determiner to estimate a brightness of surroundings and to determine a shutter speed for a frame of the moving image to be currently captured based on the estimated brightness of the surroundings; and
a mode changer to determine whether or not an exposure time, for capturing the moving image, that is dependent on the shutter speed is longer than a predetermined time period, and to change the first read-out mode to a second read-out mode that has a shorter read-out time than a read-out time of the first read-out mode so that the predetermined frame rate is maintained when the mode changer determines that the exposure time is longer than the predetermined time period,
wherein the mode changer estimates a time allocated to each frame when capturing the moving image having the predetermined frame rate and determines whether the exposure time is longer than the predetermined time period when a sum total of the exposure time and a read-out time of the first read-out mode is longer than the time allocated to each frame.

10. The apparatus of claim 9, wherein the at least one processor further comprises an image scaler to upscale a size of a read-out image of the second read-out mode so that the size of the read-out image of the second read-out mode equals a size of a read-out image of the first read-out mode.

11. The apparatus of claim 9, wherein the predetermined time period is a maximum possible exposure time to capture the moving image without changing the predetermined frame rate.

12. The apparatus of claim 9, further comprising:
image sensors to convert optical signals into electrical signals; and
a digital signal processor to read-out images from the image sensors,
wherein when read-out is performed by the image sensors in the second read-out mode, a horizontally skipped line rate of the second read-out mode is higher than a horizontally skipped line rate of the first read-out mode.

13. The apparatus of claim 12, wherein when read-out is performed by the image sensors in the second read-out mode, a vertically skipped line rate of the second read-out mode is higher than a vertically skipped line rate of the first read-out mode.

14. The apparatus of claim 9, wherein the mode changer counts a number of frames in which the exposure time is longer than the predetermined time period and changes the first read-out mode to the second read-out mode when the counted number of the frames is greater than a predetermined number of frames.

15. The apparatus of claim 9, wherein the digital photographing apparatus captures a 3-dimensional (3D) moving image having a predetermined frame rate in the first read-out mode.

16. The apparatus of claim 15, wherein, for the 3D moving image, the mode changer estimates a time allocated to each frame when capturing the 3D moving image having the predetermined frame rate and determines that the exposure time is longer than the predetermined time period when a sum total of the exposure time, a left and right liquid shutter change timing, and a read-out time of the first read-out mode is longer than the time allocated to each frame.

17. A non-transitory computer-readable recording medium having recorded thereon a program, which, when executed by at least one processor, performs a method comprising:
capturing a moving image with a predetermined frame rate in a first read-out mode;
estimating a brightness of surroundings;
determining a shutter speed for a frame of the moving image to be currently captured, based on the estimated brightness of the surroundings;
determining whether or not an exposure time, for capturing the moving image, that is dependent on the shutter speed is longer than a predetermined time period; and
changing the first read-out mode to a second read-out mode that has a shorter read-out time than a read-out time of the first read-out mode so that the predetermined frame rate is maintained when determining that the exposure time is longer than the predetermined time period,
wherein the determining of whether or not the exposure time, for capturing the moving image, that is dependent on the shutter speed is longer than the predetermined time period comprises:
estimating a time allocated to each frame when capturing the moving image having the predetermined frame rate; and
determining whether or not the exposure time is longer than the predetermined time period when a sum total of the exposure time and a read-out time of the first read-out mode is longer than the time allocated to each frame.

18. A method of controlling a digital photographing apparatus using a plurality of image sensor read-out modes to capture frames of a moving image with a predetermined frame rate, comprising:
determining a shutter speed and exposure time corresponding to the shutter speed to capture a frame;
determining a sum total of the exposure time and a read-out time of a first read-out mode;
determining whether an exposure time for capturing the frame is longer than a predetermined time period;
changing the first read-out mode to a second read-out mode that has a shorter read-out time than the read-out time of the first read-out mode when determining that the exposure time is longer than the predetermined time period such that the frame is captured while maintaining the predetermined frame rate; and
capturing the frame in the second read-out mode,
wherein the determining of whether the exposure time for capturing the frame is longer than the predetermined time period comprises:
estimating a time allocated to each frame when capturing the moving image having the predetermined frame rate; and
determining whether the exposure time is longer than the predetermined time period when the sum total of the exposure time and the read-out time of the first read-out mode is longer than the time allocated to the frame.

19. The method of claim 18, further comprising:
upscaling a resolution of the captured frame when the resolution of the captured frame is lower than a resolution of a prior captured frame due to the second read-out mode.

20. The method of claim 18, wherein in the determining of the sum total, the sum total includes a left liquid crystal shutter and a right liquid crystal shutter change timing for capturing a 3-dimensional moving image within the sum total.

21. The method of claim 18, wherein the changing of the first read-out mode to the second read-out mode comprises
counting a number of frames in which the sum total exceeds the frame time of the predetermined frame rate and
changing the read-out mode when the number of counted frames exceeds a predetermined number of frames.

* * * * *